United States Patent
Agirman et al.

(10) Patent No.: US 11,398,794 B2
(45) Date of Patent: Jul. 26, 2022

(54) VARIABLE FREQUENCY DRIVE THERMAL MANAGEMENT

(71) Applicant: CARRIER CORPORATION, Palm Beach Gardens, FL (US)

(72) Inventors: Ismail Agirman, Southington, CT (US); Timothy M. Remmers, Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/734,638

(22) PCT Filed: Oct. 29, 2019

(86) PCT No.: PCT/US2019/058497
§ 371 (c)(1),
(2) Date: Dec. 3, 2020

(87) PCT Pub. No.: WO2020/096809
PCT Pub. Date: May 14, 2020

(65) Prior Publication Data
US 2021/0234497 A1 Jul. 29, 2021

Related U.S. Application Data

(60) Provisional application No. 62/755,742, filed on Nov. 5, 2018.

(51) Int. Cl.
*H02P 29/68* (2016.01)
*H02P 27/08* (2006.01)

(52) U.S. Cl.
CPC .............. *H02P 29/68* (2016.02); *H02P 27/08* (2013.01)

(58) Field of Classification Search
CPC .. H02P 27/08; H02P 29/68; H02P 1/00; H02P 1/04; H02P 1/16; H02P 1/163;
(Continued)

(56) References Cited

U.S. PATENT DOCUMENTS 6,965,502 B2 11/2005 Duffy et al.
7,042,202 B2 5/2006 Sutardja et al.
(Continued)

FOREIGN PATENT DOCUMENTS

| CN | 105191115 A | 12/2015 |
|---|---|---|
| KR | 101216464 B1 | 6/2012 |
| WO | 2014151375 A1 | 9/2014 |

OTHER PUBLICATIONS

PCT International Search Report and Written Opinion; dated Feb. 13, 2020; Application No. PCT/2019/058497; Filed: Oct. 29, 2019; 12 pages.
(Continued)

*Primary Examiner* — Antony M Paul
(74) *Attorney, Agent, or Firm* — Cantor Colburn LLP

(57) ABSTRACT

A system and method for thermal management in a variable frequency drive is provided. Aspects include receiving, by a processor, operational data associated with a variable frequency drive, the operational data including one or more operational parameters for the variable frequency drive, comparing the one or more operational parameters to a threshold, and operating the variable frequency drive to produce a first modulated output based at least in part on the one or more operational parameters being below the threshold.

12 Claims, 4 Drawing Sheets

(58) Field of Classification Search
CPC ...... H02P 1/24; H02P 1/26; H02P 1/42; H02P 1/423; H02P 1/46; H02P 6/00; H02P 6/12; H02P 7/00; H02P 7/29; H02P 21/00; H02P 21/22; H02P 21/14; H02P 23/14; H02P 27/00; H02P 27/04; H02P 27/06; H02P 29/60; H02P 29/64

See application file for complete search history.

(56) References Cited

U.S. PATENT DOCUMENTS

| | | | |
|---|---|---|---|
| 7,573,249 B2 | 8/2009 | Sutardja et al. | |
| 7,755,342 B2 | 7/2010 | Chen et al. | |
| 7,888,924 B2* | 2/2011 | Tran | H02M 3/1582 323/284 |
| 8,193,790 B2 | 6/2012 | Asuncion et al. | |
| 8,896,280 B2 | 11/2014 | Tang et al. | |
| 9,236,828 B1 | 1/2016 | Wei et al. | |
| 9,350,244 B2 | 5/2016 | Tang et al. | |
| 9,543,847 B2 | 1/2017 | Karlsson et al. | |
| 9,548,659 B2 | 1/2017 | Houston et al. | |
| 9,559,630 B2* | 1/2017 | Marohl | H02P 27/085 |
| 9,590,540 B2 | 3/2017 | Wu et al. | |
| 9,595,907 B2* | 3/2017 | Marohl | H02P 27/085 |
| 9,762,173 B2 | 9/2017 | Ochs et al. | |
| 10,187,000 B2* | 1/2019 | Borisov | H02P 27/06 |
| 10,693,406 B2* | 6/2020 | Borisov | H02M 1/32 |
| 2009/0058350 A1 | 3/2009 | Wei et al. | |
| 2014/0197765 A1* | 7/2014 | Kim | H02P 29/50 318/400.2 |
| 2015/0327399 A1 | 11/2015 | West et al. | |
| 2015/0377537 A1* | 12/2015 | West | F25B 31/006 62/115 |

OTHER PUBLICATIONS

International Preliminary Report on Patentability; dated May 11, 2021; Application No. PCT/US2019/058497; Filed: Oct. 29, 2019; 6 pages.

* cited by examiner

VARIABLE FREQUENCY DRIVE THERMAL MANAGEMENT

CROSS REFERENCE TO RELATED APPLICATIONS

This application claims the benefit of U.S. Application No. 62/755,742, filed on Nov. 5, 2018, which is incorporated herein by reference in its entirety.

BACKGROUND

Exemplary embodiments pertain to the art of variable frequency drives and more specifically to variable frequency drive thermal management for HVAC/Chiller systems.

Heating, ventilation, and air-conditioning (HVAC) and chiller systems, typically, utilize a variable frequency drive (VFD) to operate certain components of these systems. A VFD is a type of adjustable-speed drive used in electro-mechanical drive systems to control AC motor speeds and torque by varying motor input frequency and voltage. For HVAC and chiller systems, VFDs can utilize a standard space vector pulse width modulation (SVPWM) to control a motor input frequency and voltage. This standard SVPWM is utilized for acoustic and smooth operation considerations. However, VFDs can suffer from thermal trip when utilizing SVPWM and when exposed to extreme load conditions with high modulation indexes and high load conditions.

BRIEF DESCRIPTION

Disclosed is a system. The system includes a variable frequency drive, a sensor configured to collect operational data associated with the variable frequency drive, and a controller configured to receive, from the sensor, operational data, the operational data including one or more operational parameters for the variable frequency drive, compare the one or more operational parameters to a threshold, and based on the one or more operational parameters being below the threshold, operate the variable frequency drive to produce a first modulated output.

In addition to one or more of the features described above, or as an alternative, further embodiments of the system may include that the controller is further configured to, based on at least one of the one or more operational parameters exceeding the threshold, operate the variable frequency drive to produce a second modulated output.

In addition to one or more of the features described above, or as an alternative, further embodiments of the system may include that the first modulated output includes a space vector pulse width modulation (SVPWM) output.

In addition to one or more of the features described above, or as an alternative, further embodiments of the system may include that the second modulated output includes a discontinuous pulse width modulation (DPWM) output.

In addition to one or more of the features described above, or as an alternative, further embodiments of the system may include that the second modulated output is produced by the variable frequency drive for a first time period.

In addition to one or more of the features described above, or as an alternative, further embodiments of the system may include that the controller is further configured to operate the variable frequency drive to produce the first modulated output in response to an expiration of the first time period.

In addition to one or more of the features described above, or as an alternative, further embodiments of the system may include that the one or more operational parameters includes a temperature parameter (sensor) and a voltage command (modulation index) parameter.

In addition to one or more of the features described above, or as an alternative, further embodiments of the system may include that the controller is further configured to operate the variable frequency drive to produce the first modulated output in response to the at least one of the one or more operational parameters being below the threshold.

In addition to one or more of the features described above, or as an alternative, further embodiments of the system may include that the controller is further configured to monitor the operational data associated with the variable frequency drive to determine a rate of change to the one or more operational parameters, operate the variable frequency drive to produce the second modulated output for a second time period, wherein the second period of time is based at least in part on the rate of change to the one or more operational parameters, and operate the variable frequency drive to produce the first modulated output in response to an expiration of the second time period.

Disclosed is a method for thermal management. The method includes receiving, by a processor, operational data associated with a variable frequency drive, the operational data including one or more operational parameters for the variable frequency drive, comparing the one or more operational parameters to a threshold, and based on the one or more operational parameters being below the threshold, operating the variable frequency drive to produce a first modulated output.

In addition to one or more of the features described above, or as an alternative, further embodiments of the method may include based on at least one of the one or more operational parameters exceeding the threshold, operating the variable frequency drive to produce a second modulated output.

In addition to one or more of the features described above, or as an alternative, further embodiments of the method may include that the first modulated output includes a space vector pulse width modulation (SVPWM) output.

In addition to one or more of the features described above, or as an alternative, further embodiments of the method may include that the second modulated output includes a discontinuous pulse width modulation (DPWM) output.

In addition to one or more of the features described above, or as an alternative, further embodiments of the method may include that the second modulated output is produced by the variable frequency drive for a first time period.

In addition to one or more of the features described above, or as an alternative, further embodiments of the method may include operating the variable frequency drive to produce the first modulated output in response to an expiration of the first time period.

In addition to one or more of the features described above, or as an alternative, further embodiments of the method may include that the one or more operational parameters includes a temperature (heat sink sensor feedback) parameter and a voltage command to the motor as the output of the inverter or in other words the modulation index parameter of the PWM generation action.

In addition to one or more of the features described above, or as an alternative, further embodiments of the method may include that the second modulated output is produced by the variable frequency drive until the at least one or the one or more operational parameters is below the threshold.

In addition to one or more of the features described above, or as an alternative, further embodiments of the method may include operating the variable frequency drive to produce the first modulated output in response to the at least one of the one or more operational parameters being below the threshold.

In addition to one or more of the features described above, or as an alternative, further embodiments of the method may include that monitoring the operational data associated with the variable frequency drive to determine a rate of change to the one or more operational parameters, operating the variable frequency drive to produce the second modulated output for a second time period, wherein the second period of time is based at least in part on the rate of change to the one or more operational parameters, and operating the variable frequency drive to produce the first modulated output in response to an expiration of the second time period.

BRIEF DESCRIPTION OF THE DRAWINGS

The following descriptions should not be considered limiting in any way. With reference to the accompanying drawings, like elements are numbered alike.

The diagrams depicted herein are illustrative. There can be many variations to the diagram or the operations described therein without departing from the spirit of the disclosure. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Figure 1:
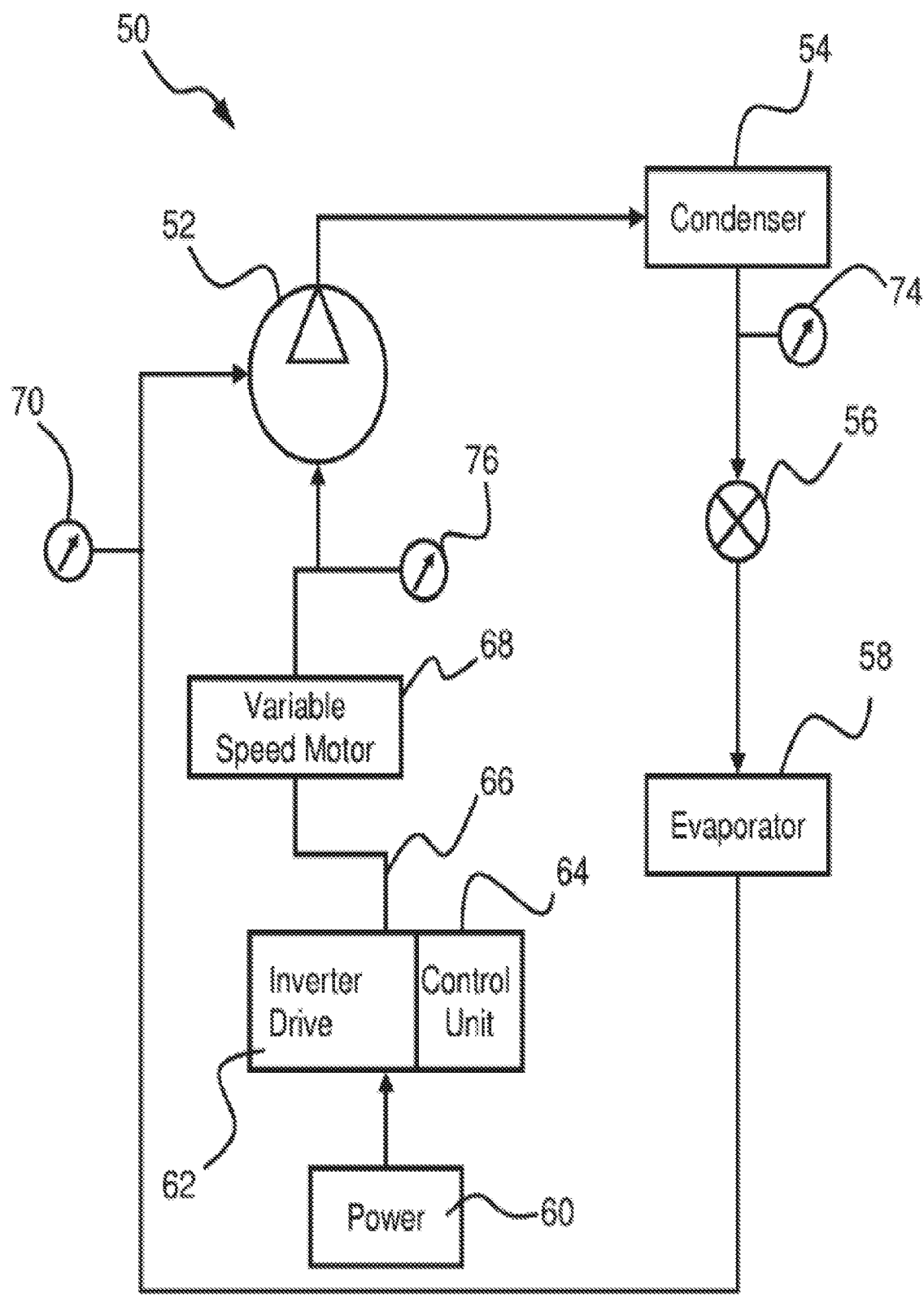
FIG. 1 depicts a block diagram of a refrigerant vapor compression system for use in implementing one or more embodiments.

Referring to FIG. 1, there is shown a refrigerant vapor compression system 50 having a variable speed compressor 52 driven by a variable speed motor 68 according to one or more embodiments. The system 50 includes refrigerant vapor from compressor 52 that is delivered to a condenser 54 where the refrigerant vapor is liquefied at high pressure, thereby rejecting heat to the outside air. The liquid refrigerant exiting condenser 54 is delivered to an evaporator 58 through an expansion valve 56. In embodiments, the expansion valve 56 may be a thermostatic expansion valve or an electronic expansion valve for controlling super heat of the refrigerant. The refrigerant passes through the expansion valve 56 where a pressure drop causes the high-pressure liquid refrigerant to achieve a lower pressure combination of liquid and vapor. As the indoor air passes across evaporator 58, the low-pressure liquid refrigerant absorbs heat from the indoor air, thereby cooling the air and evaporating the refrigerant. The low-pressure refrigerant is again delivered to compressor 52 where it is compressed to a high-pressure, high temperature gas, and delivered to condenser 54 to start the refrigeration cycle again. It is to be appreciated that while a specific refrigeration system is shown, the present teachings are applicable to any heating or cooling system, including a heat pump, HVAC, and chiller systems. In a heat pump, during cooling mode, the process is identical to that as described hereinabove, while in the heating mode, the cycle is reversed with the condenser and evaporator of the cooling mode acting as an evaporator and condenser, respectively.

Turning now to an overview of technologies that are more specifically relevant to aspects of the disclosure, the system 50 includes a compressor 52 driven by an inverter drive 62. In embodiments, the inverter drive 62 may be a variable frequency drive (VFD) or a brushless DC motor (BLDC) drive. Particularly, inverter drive 62 is operably coupled to compressor 52, and receives an alternating current (AC) electrical power (for example, electrical power is a single-phase AC line power at 230V/60 Hz) from a power supply 60 and outputs electrical power on line 66 to a variable speed motor 68. The variable speed motor 68 provides mechanical power to drive a crankshaft of the compressor 62. In an embodiment, the variable speed motor 68 may be integrated inside the exterior shell of the compressor 62. Inverter drive 62 includes solid-state electronics to modulate the frequency of electrical power on line 66. In an embodiment, inverter drive 62 converts the AC electrical power, received from supply 60, from AC to direct current (DC) using a rectifier, and then converts the electrical power from DC back to a pulse width modulated (PWM) signal, using an inverter, at a desired PWM frequency in order to drive the motor 68 at a motor speed associated with the PWM DC frequency. For example, inverter drive 62 may directly rectify electrical power with a full-wave rectifier bridge, and may then chop the electrical power using insulated gate bipolar transistors (IGBT's) or thyristors to achieve the desired PWM frequency. In embodiments, other suitable electronic components may be used to modulate the frequency of electrical power from power supply 60. Further, control unit 64 includes a processor for executing an algorithm used control the PWM frequency that is delivered on line 66 to the motor 68. By modulating the PWM frequency of the electrical power delivered on line 66 to the electric motor 68, control unit 64 thereby controls the torque applied by motor 68 on compressor 52 there by controlling its speed, and consequently the capacity, of compressor 52. Also shown, the control unit (controller) 64 includes a computer readable medium for storing data in a memory unit related to estimating compressor discharge pressure from compressor and refrigeration system parameters. In embodiments, the control unit 64 stores information related to compressor torque as well as line voltages, compressor motor current, and compressor speed obtained from inverter drive 62.

In one or more embodiments, the variable speed drive (inverter) 62 can utilize a standard space vector PWM (SVPWM) for acoustic and smooth operation reasons when driving the variable speed motor 68 in the system 50. However, as mentioned above, operating with a SVPWM under extreme load conditions can cause thermal trip within the VFD 62. In one or more embodiments, a heat sink and a sensor can be utilized to address thermal trip by the control unit 64 monitoring the heat sink temperature using the sensor. When the temperature approaches to thermal trip level (e.g., threshold temperature, for example, 90 degrees Celsius), the VFD can switch to a discontinuous PWM (DPWM) for a set or variable time period or until the heat sink temperature returns to below the threshold temperature. After the expiration of this time period in DPWM mode of operation, the VFD can resume back to the SVPWM mode if the margin from the thermal trip is large. In one or more embodiments, the reason for remaining at the DPWM mode for a set period of time is to avoid chattering of DPWM and standard SVPWM causing irregular and noticeable acoustic noise.

In one or more embodiments, a second condition, besides thermal trip, can be utilized when switching to DPWM mode in the VFD. This second condition includes a voltage modulation index. For example, when the modulation index is above 85%-90%, is added to the decision for switching to DPWM. The reason for this second condition in the decision is to avoid excessive PWM ripple in the variable speed motor 68 which can cause increased noise level from the variable speed motor 68 and also increases motor losses.

In one or more embodiments, when switching to the DPWM mode, the control unit 64 can keep the VFD 62 in this DPWM mode until the operational conditions (e.g., temperature and voltage command or modulation index) are below the threshold temperature and threshold voltage modulation. Once the operational conditions return to below the threshold levels, the control unit 64 can operation the VFD 62 to produce the SVPWM output. In one or more embodiments, the VFD 62 is operated in the DPWM mode for a time period. Also, the control unit 64 can monitor the operational conditions, through the sensor, to determine a rate of change to the operational conditions. For example, if the temperature is slowly falling, the control unit 64 can determine the rate of change and set a time period for when to switch back to SVPWM mode.

Figure 2:
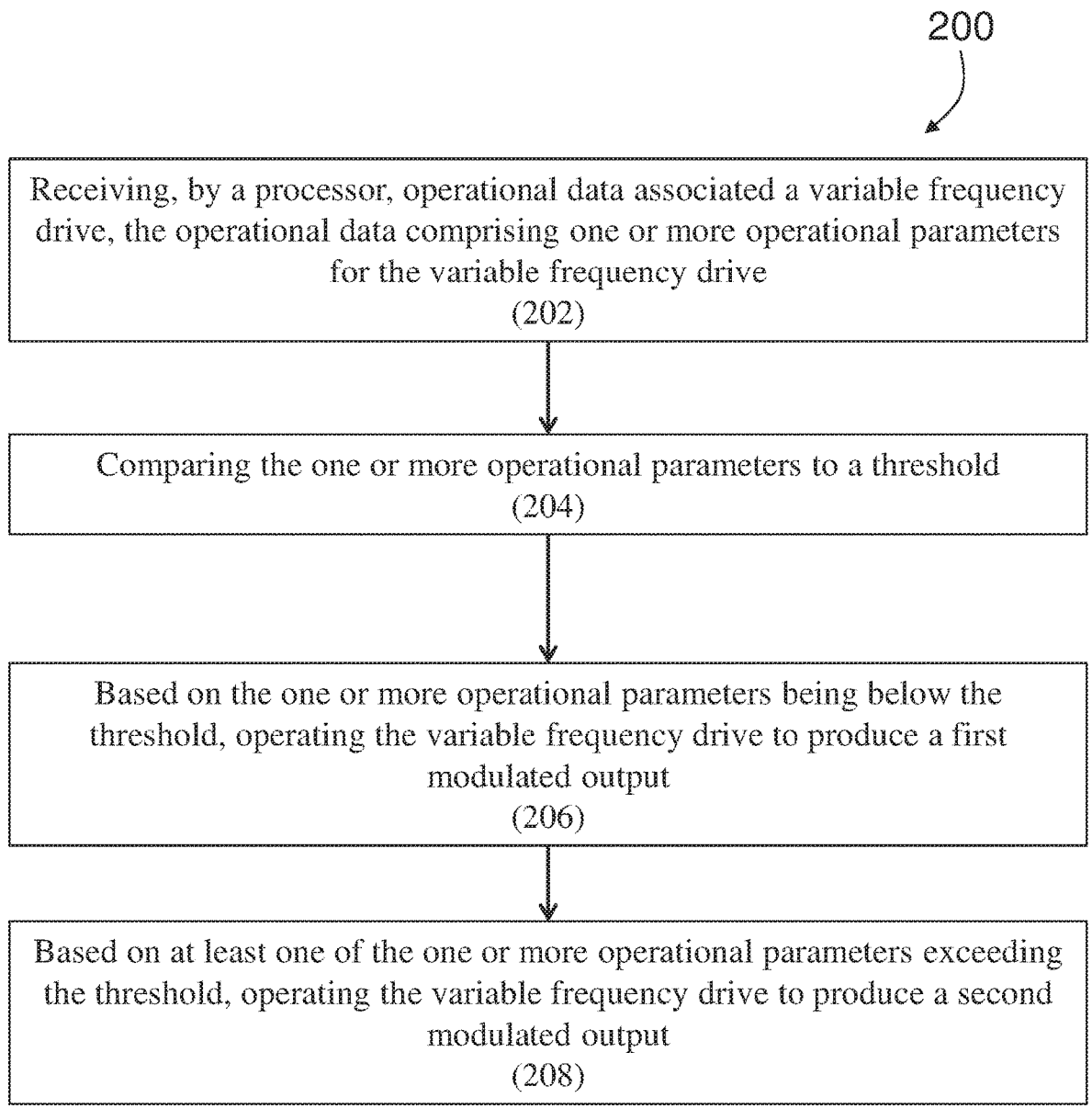
FIG. 2 depicts a flow diagram of a method for thermal management in a variable frequency drive according to one or more embodiments.

FIG. 2 depicts a flow diagram of a method for thermal management in a variable frequency drive according to one or more embodiments. The method 200 includes receiving, by a processor, operational data associated with a variable frequency drive, the operational data comprising one or more operational parameters for the variable frequency drive, as shown in block 202. At block 204, the method 200 includes comparing the one or more operational parameters to a threshold. And based on the one or more operational parameters being below the threshold, the method 200 includes operating the variable frequency drive to produce a first modulated output, as shown at block 206. And at block 208, the method 200 includes, based on at least one of the one or more operational parameters exceeding the threshold, operating the variable frequency drive to produce a second modulated output.

Additional processes may also be included. It should be understood that the processes depicted in FIG. 2 represent illustrations and that other processes may be added or existing processes may be removed, modified, or rearranged without departing from the scope and spirit of the present disclosure.

Figure 3:
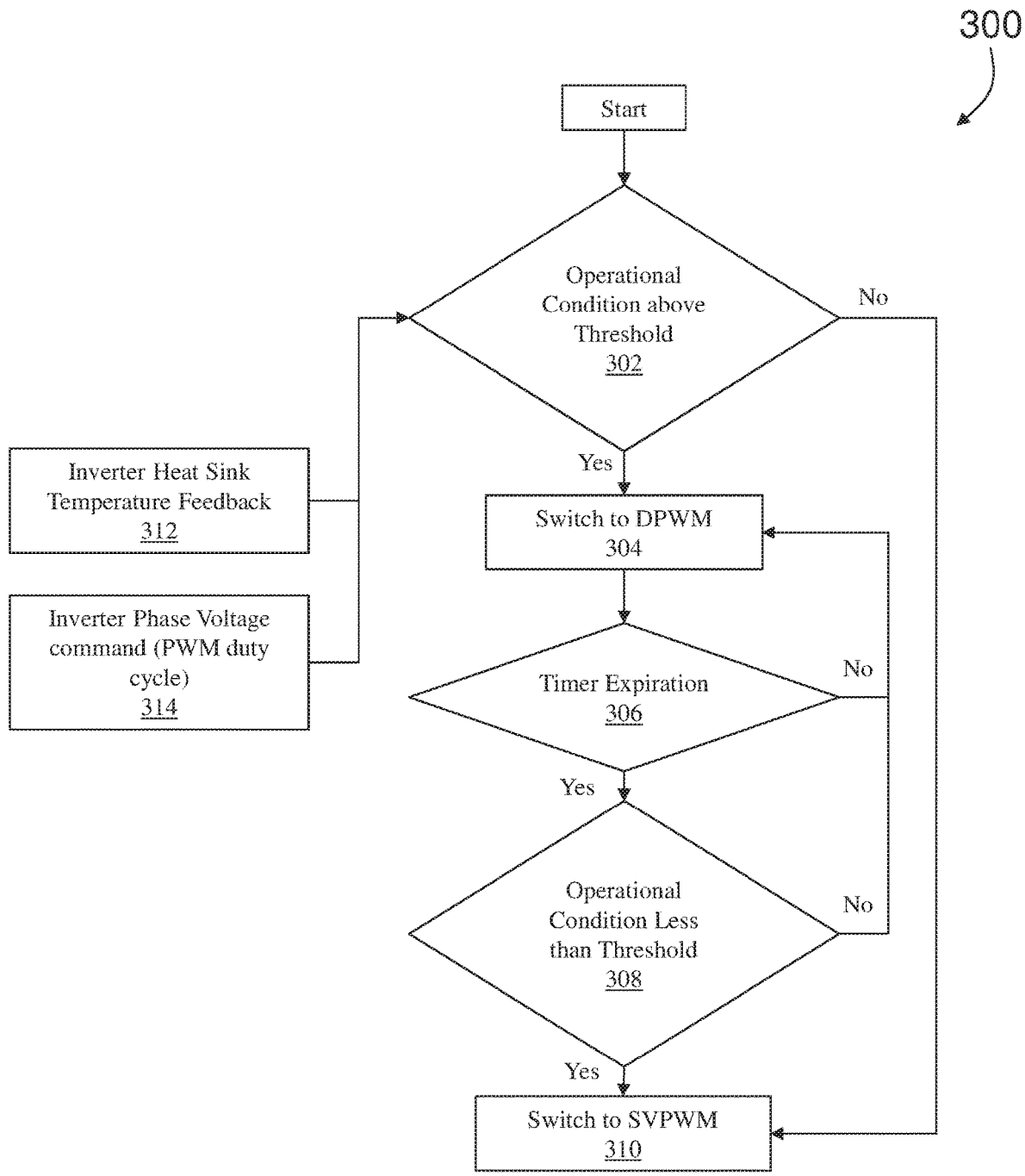
FIG. 3 depicts a flow diagram of a method for thermal management in a variable frequency drive according to one or more embodiments.

FIG. 3 depicts a flow diagram of a method for thermal management in a variable frequency drive according to one or more embodiments. In one or more embodiments, the method 300 begins at decision block 302 that is monitoring operational conditions to determine that the operational conditions exceed a threshold operating condition. The operating conditions being monitored include, but are not limited to, the inverter heat sink temperature 312 and the inverter phase voltage 314. For example, if the heat sink temperature exceeds 90 degrees C. (threshold temperature) then the decision block moves to process step 304. At process step 304, the method 300 switches the operational frequency of the inverter to the DPWM mode. While in DPWM mode, a timer can be set and the operational conditions can be continued to be monitored. When the timer expires, at decision block 306, the operational conditions are analyzed. In one or more embodiments, the timer can be set to a longer time period than needed for the VFD heat sink cool down time. Having a set time longer than needed for the heat sink to cool down avoids a cyclic nature of entering and exiting the DPWM mode which can cause customer discomfort with the HVAC system due to noise. In one or more embodiments, the timer can have varying minimum time periods when entering DPWM mode to avoid a cyclic change. At decision block 308, when both the timer has expired and the operational conditions are below the threshold, the method 300 proceeds to process block 310 and switches back to SVPWM for the inverter. If the timer is not expired or the operational conditions are above the threshold, the inverter remains in DPWM mode.

Figure 4:
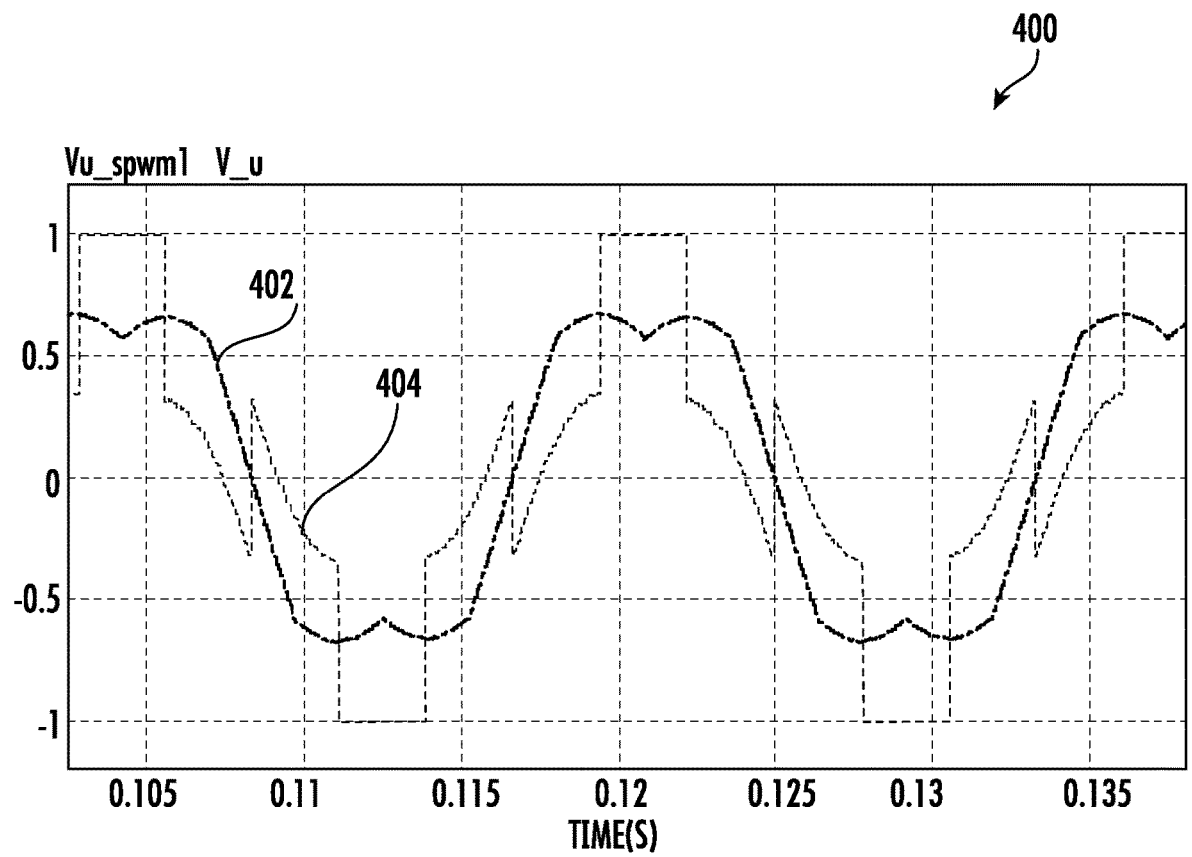
FIG. 4 depicts a graphical representation of a DPWM and SPWM wave form according to one or more embodiments.

FIG. 4 depicts a graphical representation of a DPWM and SPWM wave form according to one or more embodiments. The graphical representation 400 includes a wave form for the SVPWM mode 402 and the DPWM mode 404.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for thermal management in a variable frequency drive, the method comprising:
   receiving, by a processor, operational data associated with a variable frequency drive, the operational data comprising one or more operational parameters for the variable frequency drive;
   comparing the one or more operational parameters to a threshold;
   operating the variable frequency drive to produce a first modulated output based at least in part on the one or more operational parameters being below the threshold; and operating the variable frequency drive to produce a second modulated output based at least in part on at least one of the one or more operational parameters exceeding the threshold;
wherein the second modulated output is produced by the variable frequency drive for a first time period;
operating the variable frequency drive to produce the first modulated output in response to an expiration of the first time period.

2. The method of claim 1, wherein the first modulated output comprises a space vector pulse width modulation (SVPWM) output.

3. The method of claim 1, wherein the second modulated output comprises a discontinuous pulse width modulation (DPWM) output.

4. The method of claim 1, wherein the second modulated output is produced by the variable frequency drive until the at least one or the one or more operational parameters is below the threshold.

5. The method of claim 4, further comprising:
operating the variable frequency drive to produce the first modulated output in response to the at least one of the one or more operational parameters being below the threshold.

6. A method for thermal management in a variable frequency drive, the method comprising:
receiving, by a processor, operational data associated with a variable frequency drive, the operational data comprising one or more operational parameters for the variable frequency drive;
comparing the one or more operational parameters to a threshold; and
operating the variable frequency drive to produce a first modulated output based at least in part on the one or more operational parameters being below the threshold;
operating the variable frequency drive to produce a second modulated output based at least in part on at least one of the one or more operational parameters exceeding the threshold;
monitoring the operational data associated with the variable frequency drive to determine a rate of change to the one or more operational parameters;
operating the variable frequency drive to produce the second modulated output for a time period, wherein the time period is based at least in part on the rate of change to the one or more operational parameters; and
operating the variable frequency drive to produce the first modulated output in response to an expiration of the time period.

7. A system comprising:
a variable frequency drive;
a sensor configured to collect operational data associated with the variable frequency drive; and
a controller configured to:
receive, from the sensor, operational data, the operational data comprising one or more operational parameters for the variable frequency drive;
compare the one or more operational parameters to a threshold; and
operate the variable frequency drive to produce a first modulated output based at least in part on the one or more operational parameters being below the threshold;
wherein the controller is further configured to operate the variable frequency drive to produce a second modulated output based at least in part on at least one of the one or more operational parameters exceeding the threshold;
wherein the second modulated output is produced by the variable frequency drive for a first time period;
wherein the controller is further configured to operate the variable frequency drive to produce the first modulated output in response to an expiration of the first time period.

8. The system of claim 7, wherein the first modulated output comprises a space vector pulse width modulation (SVPWM) output.

9. The system of claim 7, wherein the second modulated output comprises a discontinuous pulse width modulation (DPWM) output.

10. The system of claim 7, wherein the second modulated output is produced by the variable frequency drive until the at least one of the one or more operational parameters is below the threshold.

11. The system of claim 10, wherein the controller is further configured to:
operate the variable frequency drive to produce the first modulated output in response to the at least one of the one or more operational parameters being below the threshold.

12. A system comprising:
a variable frequency drive;
a sensor configured to collect operational data associated with the variable frequency drive; and
a controller configured to:
receive, from the sensor, operational data, the operational data comprising one or more operational parameters for the variable frequency drive;
compare the one or more operational parameters to a threshold; and
operate the variable frequency drive to produce a first modulated output based at least in part on the one or more operational parameters being below the threshold;
wherein the controller is further configured to operate the variable frequency drive to produce a second modulated output based at least in part on at least one of the one or more operational parameters exceeding the threshold;
wherein the controller is further configured to:
monitor the operational data associated with the variable frequency drive to determine a rate of change to the one or more operational parameters;
operate the variable frequency drive to produce the second modulated output for a time period, wherein the time period is based at least in part on the rate of change to the one or more operational parameters; and
operate the variable frequency drive to produce the first modulated output in response to an expiration of the time period.

* * * * *